(12) United States Patent
Kulkarni

(10) Patent No.: US 9,172,744 B2
(45) Date of Patent: Oct. 27, 2015

(54) SCALABLE STORAGE WITH PROGRAMMABLE NETWORKS

(75) Inventor: Harish S. Kulkarni, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 416 days.

(21) Appl. No.: 13/523,121

(22) Filed: Jun. 14, 2012

(65) Prior Publication Data

US 2013/0339486 A1 Dec. 19, 2013

(51) Int. Cl.
 *G06F 15/16* (2006.01)
 *H04L 29/08* (2006.01)

(52) U.S. Cl.
 CPC ..................................... *H04L 67/10* (2013.01)

(58) Field of Classification Search
 CPC ... G06F 15/16; H04L 67/10; H04L 29/08072; H04L 29/06; H04L 29/0809; H04L 29/08117
 USPC .................. 709/203, 213, 214, 216, 217, 219
 See application file for complete search history.

(56) References Cited

U.S. PATENT DOCUMENTS

| | | | | |
|---|---|---|---|---|
| 5,054,019 A * | 10/1991 | Mathis et al. | .................. | 370/296 |
| 6,163,873 A * | 12/2000 | Murano | ........................ | 714/782 |
| 8,352,716 B1 * | 1/2013 | Chatterjee et al. | ................. | 713/2 |
| 8,356,072 B1 * | 1/2013 | Chakraborty et al. | ........ | 709/203 |
| 8,706,833 B1 * | 4/2014 | Bergant et al. | ................. | 709/214 |
| 2001/0030974 A1 * | 10/2001 | Pauwels | ........................ | 370/444 |
| 2003/0033383 A1 * | 2/2003 | Elnozahy et al. | ............. | 709/219 |
| 2003/0202520 A1 | 10/2003 | Witkowski et al. | | |
| 2004/0093430 A1 * | 5/2004 | Thomas | ........................ | 709/245 |
| 2004/0139167 A1 | 7/2004 | Edsall et al. | | |
| 2004/0215749 A1 | 10/2004 | Tsao | | |
| 2005/0149532 A1 * | 7/2005 | Hubbard | .......................... | 707/10 |
| 2005/0222948 A1 * | 10/2005 | Sato et al. | ........................ | 705/40 |
| 2006/0209863 A1 * | 9/2006 | Arndt et al. | .................... | 370/412 |
| 2007/0192444 A1 * | 8/2007 | Ackaouy et al. | .............. | 709/219 |
| 2010/0115575 A1 * | 5/2010 | Yu et al. | ......................... | 725/142 |
| 2010/0306434 A1 | 12/2010 | Dube et al. | | |
| 2011/0107113 A1 | 5/2011 | Resch et al. | | |
| 2013/0304872 A1 * | 11/2013 | Flynn et al. | .................... | 709/219 |
| 2013/0332577 A1 * | 12/2013 | Nakil et al. | .................... | 709/219 |
| 2014/0126374 A1 * | 5/2014 | Wang et al. | .................... | 370/235 |

FOREIGN PATENT DOCUMENTS

WO WO 9818089 A1 * 4/1998

OTHER PUBLICATIONS

Sobti, et al., "Network-Embedded Programmable Storage and its Applications", In Proceedings of 3rd IFIP-TC6 Networking Conference, May 2004, 12 pages.
Anderson, et al., "Interposed Request Routing for Scalable Network Storage", In Proceedings of ACM Transactions on Computer Systems, vol. 20, Issue 1, Feb. 1, 2002, 24 pages.
Beck, et al., "An End-to-End Approach to Globally Scalable Network Storage", In Proceedings of ACM SIGCOMM Conference on Applications, Technologies, Architectures, and Protocols for Computer Communications, Aug. 19-23, 2002, 9 pages.

* cited by examiner

*Primary Examiner* — Kostas Katsikis
(74) *Attorney, Agent, or Firm* — Judy Yee; Micky Minhas

(57) ABSTRACT

Described is a technology by which a scalable distributed file system is provided by deploying intelligent storage devices that are directly connected to the network. A server receives a request for data from a requester, and sends corresponding requests to the storage devices. The storage devices send data blocks directly to the requester instead of back to the server, while identifying the server as the sender, e.g., by programming a switch to participate in such an operation.

20 Claims, 5 Drawing Sheets

SCALABLE STORAGE WITH PROGRAMMABLE NETWORKS

BACKGROUND

Contemporary cloud computing and other centralized data storage scenarios (e.g., datacenters) need a great deal of storage. Contemporary storage systems based upon hard disk storage have hard disks attached directly to server nodes, typically with a single server set up as a file server. During normal operation, when a request for a file comes to this file server, the file server looks up the file system indexes and identifies the physical blocks on the hard drives that contain the file data, reads the individual blocks into memory, sets up a transfer from memory to the network interface, and completes the file transfer over the network interface.

One limitation of such a system is that the size of the file server storage is limited by the number of hard drives that can be attached to the physical machine. Large scale distributed systems overcome this limitation by setting up several such machines as peers and distributing the storage across the machines. Each machine then can have either a global view of the file index, or a local view along with peer communication to get a global view. In general, when a request for a file comes in to one of the servers, e.g., a main server machine, the main server machine identifies the peer machines across which the file blocks are distributed by looking up its local index or asking its peer machines, and requests the file blocks from each of the identified machines. Each peer machine then looks up the blocks among its local hard drives, reads the individual blocks into memory, and transfers the blocks over the network to the main server machine. The main server then assembles the file in memory from the various blocks received from the various peer machines and transfers them back over the network to complete the file transfer.

However, such a distributed system increases the size and cost of the storage by adding more compute nodes, with the additional computing power of these nodes often. This also leads to waste in the need for additional power and cooling in the datacenters. Further, there is additional bandwidth consumed in transferring the file from the machines with the data to the machine that is completing the file transfer. Moreover, with a main server handling reads and writes by assembling blocks, there is usually a limit on how many hard disks can be attached to a single server node.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, various aspects of the subject matter described herein are directed towards a technology by which a server receives a request for data from a requester and communicates with intelligent storage devices that provide response messages containing requested blocks of data in response to the server request. The data blocks are sent to the requester destination via a network switch instead of the server, yet appear as if sent by the server.

In one aspect, upon receiving a request for file access from a requester, a server identifies one or more intelligent storage devices that contain data blocks corresponding to the request. The server sends a communication to each identified intelligent storage device to access the data blocks and have the intelligent storage device return the data blocks in response to the communication to a network switch. The data blocks are sent to the requester via the intelligent storage devices and switch, in which by taking action the response or set of responses identifies the server as a sender without having been sent by the server. Taking action may include programming the switch to modify information in the response or set of responses to identify the server as the sender.

In one aspect, an index is coupled to a server, a network switch is coupled to the server, and a plurality of intelligent storage devices is coupled to the server. The server is configured respond to a request for stored data by accessing the index to identify which intelligent storage device or devices contain the data. The server communicates with the identified intelligent storage device or devices to retrieve the stored data and send the stored data via the network switch to a destination identified in the request.

In one aspect, there is described programming logic associated with a hard drive, the logic programmed to receive TCP-based request messages via an IP address associated with the hard drive and to return TCP-based response messages. Also described is receiving, at the logic, a TCP-based request message from a server for one or more data blocks maintained on the hard drive, and returning a TCP response message that includes the data in the one or more data blocks, and sending the response message to a destination IP address that is not the server IP address.

Other advantages may become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which.

DETAILED DESCRIPTION

Various aspects of the technology described herein are generally directed towards a scalable distributed file system that is achieved by deploying intelligent storage devices (e.g., including hard disks) that are directly connected to the network. Data transfer is controlled by modifying network routes, e.g., on a programmable network switch, so that the storage devices can transfer data blocks directly to the requester (e.g., requesting client) instead of back to a server. In one aspect, a server receives a file transfer request and determines which storage devices are needed to access the blocks to satisfy that request; (a block may be any size, and there is no limitation as to how file data is distributed among drives). The storage devices are intelligent in that they are configured with or coupled to sufficient logic to receive network requests and to send the blocks directly onto the network, e.g., using TCP/IP (Transmission Control Protocol/Internet Protocol). The server instructs each storage device to access the blocks, and provides the destination to send the blocks, e.g., the IP address of the requester. In this way, a single server may be used with a relatively much larger number of hard drives, and without having to receive and reassemble the blocks for each request.

In one aspect, the server programs the network switch such that the storage devices send their blocks in an appropriate response to the destination IP address as if the server actually was responding. In an alternative implementation, the switch may be programmed to route requests to relevant storage devices based upon data in an additional header (a wrapper above a TCP header) attached to the network request from the server, and strip out the additional header on responses sent to the back to the requester's destination IP address.

It should be understood that any of the examples herein are non-limiting. For one, while hard drives are used as an example of a storage device on which file blocks are maintained, any storage media may be used. As such, the present invention is not limited to any particular embodiments, aspects, concepts, structures, functionalities or examples described herein. Rather, any of the embodiments, aspects, concepts, structures, functionalities or examples described herein are non-limiting, and the present invention may be used various ways that provide benefits and advantages in computing and data storage/retrieval in general.

Figure 1:
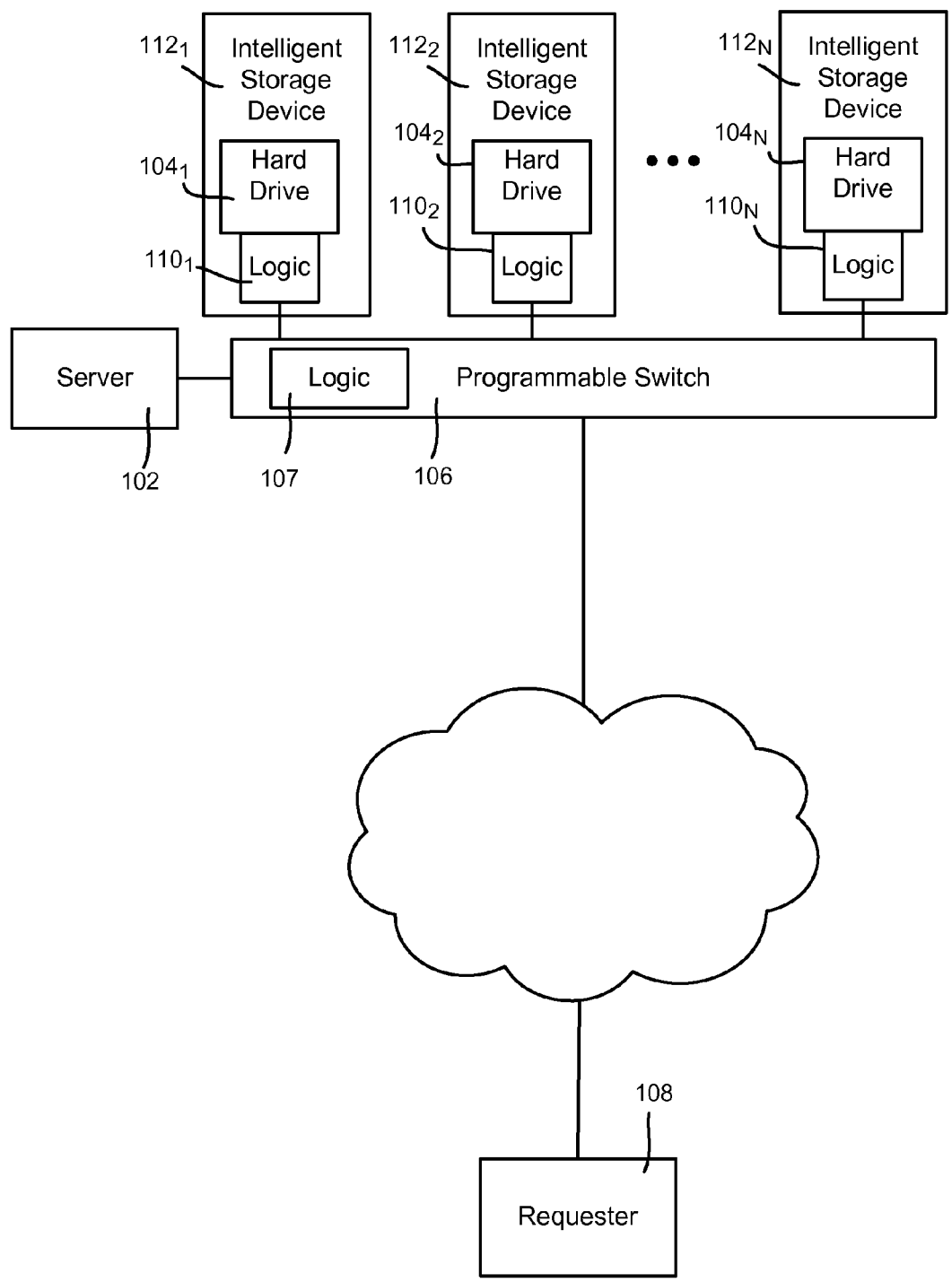
FIG. 1 is a block diagram showing example components of a system that facilitates direct sending of data blocks by intelligent storage devices to a requester that requests data from a server, according to one example embodiment.

FIG. 1 shows a block diagram comprising a server 102 coupled to an extensible bank of hard drives $104_1$-$104_N$ via a switch 106 including programmable logic 107. Such programmable switches are known in the art, and may be, for example, a network switch that allows a program to define routing policy on a per packet level, including rewriting packet headers and contents. As is understood, although one switch is shown for purposes of illustration, there may be any number of smaller switches arranged as needed to form a sufficiently large switch for coupling the server 102 to the (possibly very large number of) hard drives $104_1$-$104_N$. Further, in one alternative, the server and programmable switch can be housed in a single device.

The switch 106 is also coupled to allow file-based requests to come from a requester 108, e.g., over an intranet or the internet, for example. Example requests are HTTP (hypertext transfer protocol)-based using TCP/IP, however as will be understood, systems using other protocols may similarly benefit from the technology described herein.

In one implementation, in general, each of the hard drives $104_1$-$104_N$ include or are coupled to logic $110_1$-$110_N$ that basically associates its respective hard drive with an IP address, along with providing the ability to respond to TCP requests received at that IP address. Together, the hard drive and logic can be considered an intelligent storage device, as represented in FIG. 1 via the intelligent storage devices $112_1$-$112_N$.

In one implementation, the hard drives contain or are coupled to a small amount of logic making them TCP-enabled intelligent storage devices. To this end, the hard drives may contain custom firmware (e.g., on their controllers) that include a minimal TCP stack; the hard disk thus supports a simple interface on that TCP connection with the ability to receive an IP address from a DHCP server, communicate its size and capabilities back to the server and support a data transfer request over TCP-given block ranges to a destination IP address. In an implementation, the firmware on the hard disk may support only a simpler protocol such as ATA-over-Ethernet (with one or more extensions as described herein), with the appropriate TCP headers added to the packet at the switch In another embodiment, a (possibly very simple) computer system may be coupled to the hard drive, e.g., using an application-specific integrated circuit. An interface (e.g., SATA) to the hard drive and network interface to the switch 106 may be used with such coupled logic as well, for example. Note that although each separate set of logic $110_1$-$110_N$ is shown in FIG. 1 as being coupled to a single hard drive, it is understood that any set of logic may operate more than one hard drive; thus an intelligent storage device $112_1$-$112_N$ that uses hard drive storage media may include one or more hard drives.

In this way, each hard disk is placed directly (or basically directly via coupled logic) on the network via a network interface, and is thereafter the intelligent storage device that is provided is capable of being addressed on the network with a simple TCP connection over an established port.

Figure 2:
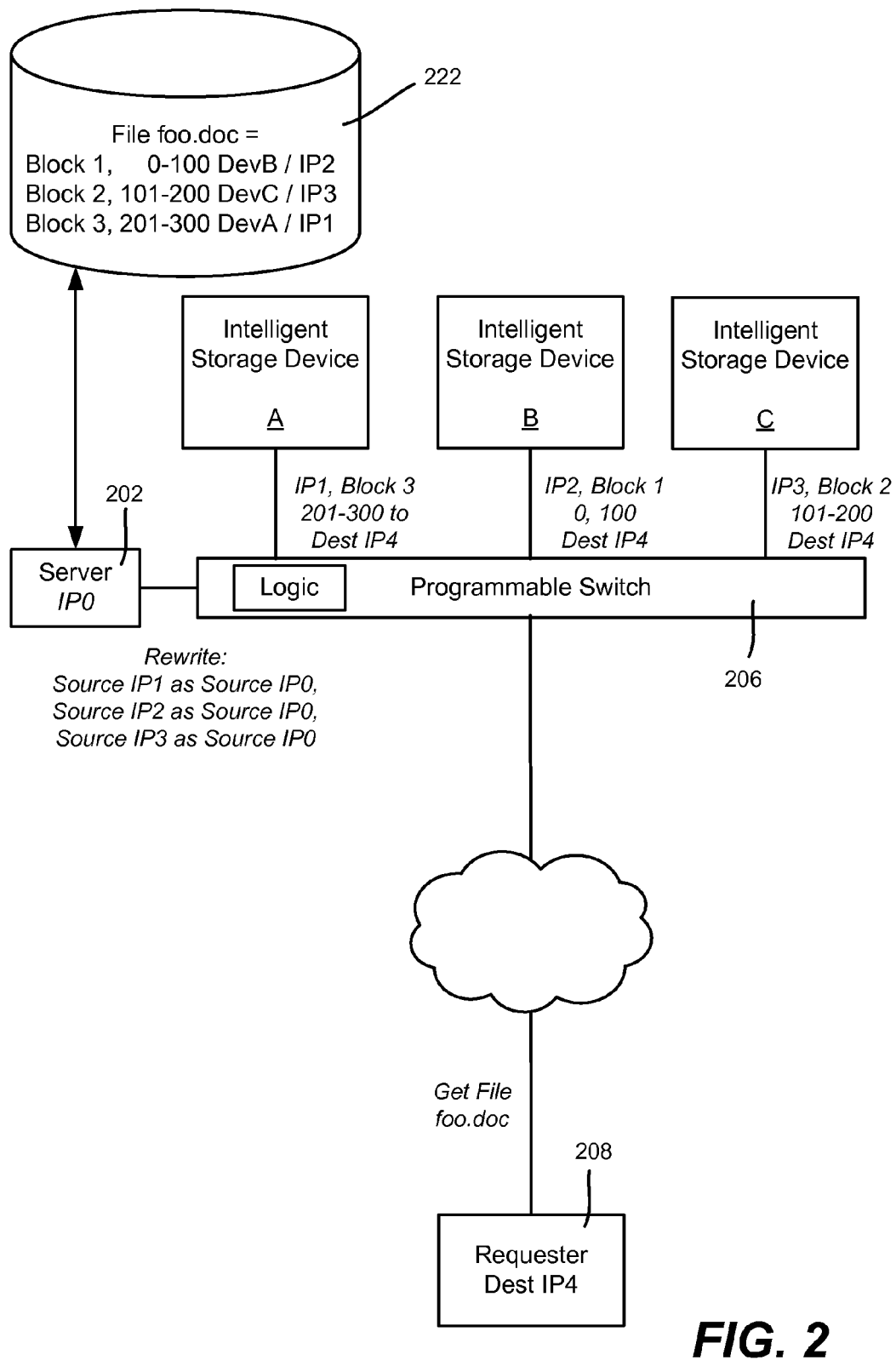
FIG. 2 is a block diagram of an example data transfer request being handled by a server, in which intelligent storage devices return the data according to one example embodiment.

FIG. 2 provides a simple example of how a request may be processed in a manner that avoids having the server reassemble blocks of data corresponding to a file read request. In FIG. 2, consider that the request is an HTTP request such as Get http://microsoft.com/foo.doc sent to a file server 202. As is known, the request includes a TCP header comprising the IP source address, IP destination address, source port, and destination Port.

When the server 202, shown as having the simplified IP address of IP0, receives the request, the server 202 looks up in an associated index 222 where (on which intelligent storage devices) the blocks are located that satisfy this request. The index may be on a conventionally accessed hard drive of the server, however it is also feasible to put (and/or back up) the index on an IP or otherwise addressable hard drive or set of hard drives.

In this simplified example of FIG. 2, consider that a first needed block one (1) corresponds to bytes 0-100 and is located on intelligent storage device B having an IP address of IP2. Further, a second needed block one (2) corresponds to bytes 101-200 and is located on intelligent storage device C having an IP address of IP3, and a third needed block corresponds to bytes 201-300 and is located on intelligent storage device A having an IP address of IP1.

The server 202 uses this information to generate requests to each intelligent storage device to return the needed data. However, instead of returning the data to the server 202, the server 202 instructs each intelligent storage device, or programs the switch, so as to return the data to the requestor's IP address as the destination instead of the server. In this manner, the server 202 need not reassemble the blocks in order for the requester 204 to receive them.

As can be readily appreciated, the requester 208 is expecting a response (or set of responses) to the file access request from the IP address of the server 202, not from another IP address. However, the switch 206 may be configured by default to write the IP address of each sender, which in this example corresponds to the intelligent storage device, into the TCP header for that response.

Described herein is taking action with respect to a transfer mechanism, accomplished by manipulating or bypassing changing of TCP headers, so that the requester 208 receives "spoofed" response packets that identify the server 202 as the sender rather than the intelligent storage device's address that actually sent them. In one implementation, the server 202 programs the switch to manipulate the headers; in this example the server 202 programs the switch 206 to change responses from any of the intelligent storage device addresses IP1, IP2 and IP3 to the servers address of IP0, and takes action such that the responses are sent to IP4 and not back to the server. It should be noted that the server and switch collaborate such that this rewriting happens on a per request basis only. Note that the switch is thus programmed to rewrite the TCP header with the correct values for destination IP (unless the intelligent storage device does so), port, sequence number and so forth. The switch also may add the SYN flag for the first packet and the FIN flag for the last packet, however the first and last packets may be sent directly from the server with the correct flags set so that the server has a record of the transfer being complete.

The rules for the data transfer may be deleted from the switch once the transfer is complete. For example, further communications from the requester 108 will be received at the server 202, and thus the switch 206 may be programmed back when the appropriate acknowledgements or the like are received at the server.

Note that because the switch may be part of a carefully controlled network, the server may not need to fully program and reprogram the switch each time. For example, the server may program the switch to always replace responses from the intelligent storage devices with the server's IP address unless the server IP address (or one or more other specified IP addresses, such as of another network server) is the destination. Only if network IP addresses change or a new hard drive is added, for example, is the switch reprogrammed for this purpose.

In another alternative, the intelligent storage device may write the server's IP address instead of its own into the TCP header. The switch is then programmed to ignore the actual sender. In other words, while the switch needs a different IP address for each intelligent storage device when sending packets to the intelligent storage devices, packets from the intelligent storage devices, in the other direction, can be detected by the switch, which is further programmed to ignore the source address in the TCP header, which the intelligent storage device has changed to the server's source address. The switch may perform other TCP modifications, e.g., SYN and FIN flags, sequence numbering, and so forth.

Note that the response packets from the intelligent storage devices have the offsets embedded inside them, and thus the system need not be concerned with packets received out of order. A dropped packet will not be acknowledged, for example, whereby after the appropriate time out the packet may be re-sent.

Figure 3:
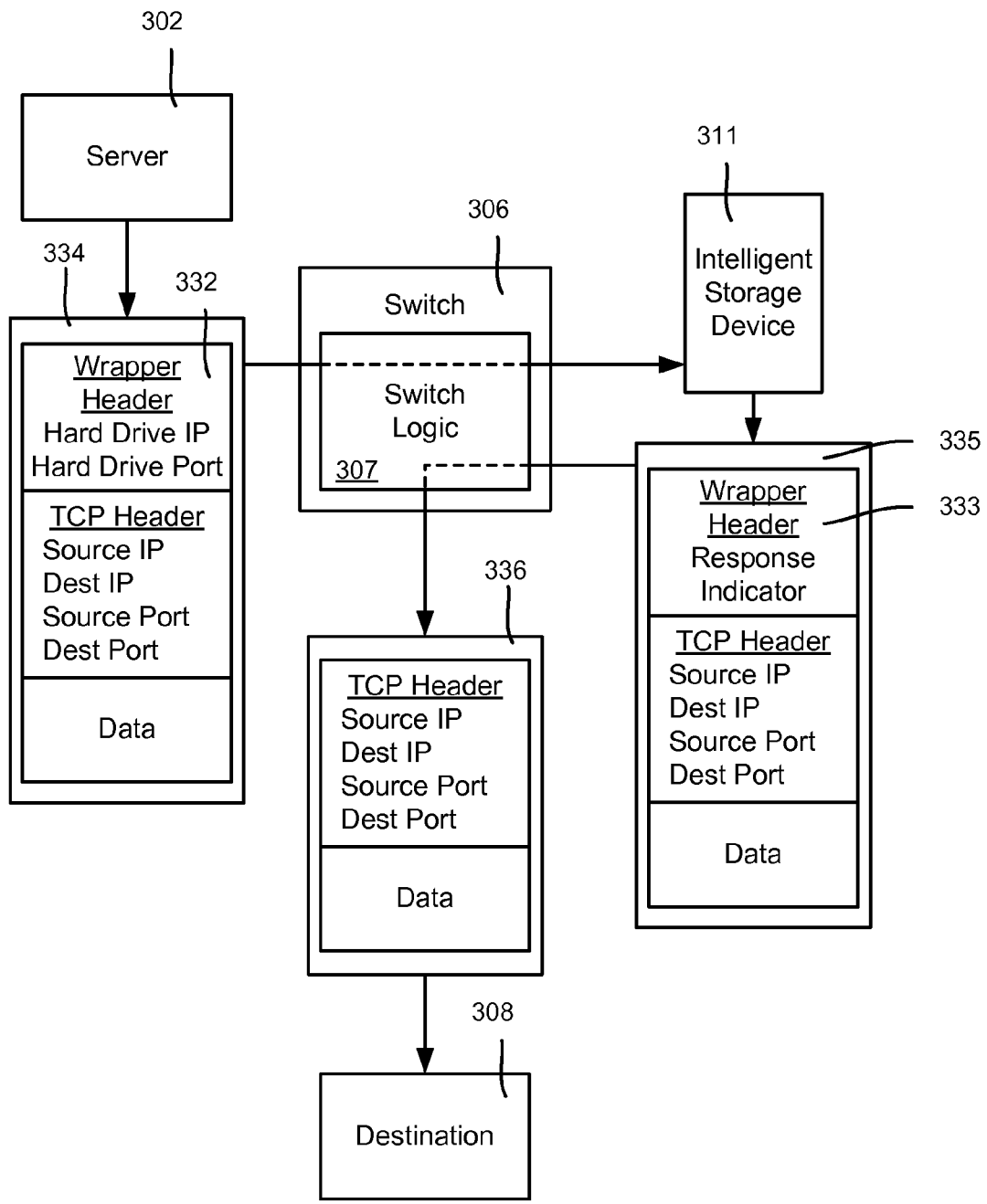
FIG. 3 is an example representation of how a request message may be extended to reach an intelligent hard drive, which returns a response, according to one example embodiment.

In another alternative generally represented in FIG. 3, for a response 336 to be sent to a destination 308 outside the network by an intelligent storage device 311, the server 302 extends the TCP protocol with a wrapper/header 332 comprising an extension that identifies the extended request 334 and provides the intelligent storage device's IP address and hard drive port. The TCP header is configured as if the server 302 was sending the response.

When the wrapper/extended header 332 is present, the switch logic 307 is programmed to detect and use this extended information, rather than the TCP header information, to send the request to the appropriate intelligent storage device 311. The intelligent storage device 311 in turn is programmed to change the data/payload and the wrapper/header into a modified response header 333, (while leaving the TCP header intact) before providing the extended response 335 to the switch 306. Such extended responses from intelligent storage devices are detected by the switch logic 307, which is programmed to strip the wrapper/header 333 before forwarding the final response 336 to the destination (the switch may perform other TCP modifications, e.g., SYN and FIN flags, sequence numbering, and so forth). The destination (client) 308 thus receives the response with the TCP information as if the server 302 returned the response, with the payload/data provided by the intelligent storage device 311 and the server 302 not involved with sending the response.

Note that file PUT requests (file upload requests) may be handled by a server sending post requests to the appropriate intelligent storage device or devices and updating the index upon completion. However, it is feasible to have writes/portions of writes go directly to an intelligent storage device after some initial server processing. The server may program the switch, for example, to send write data to a particular intelligent storage device instead of the server. Note that the intelligent storage device needs to respond back to the server with a completion status, so that the server knows when it is safe to consider a write as committed, e.g., to change the index to reflect that the data is in a new block and no longer in its previous block (which may be reclaimed as needed). The server may send the completion status to the requester.

Figure 4:
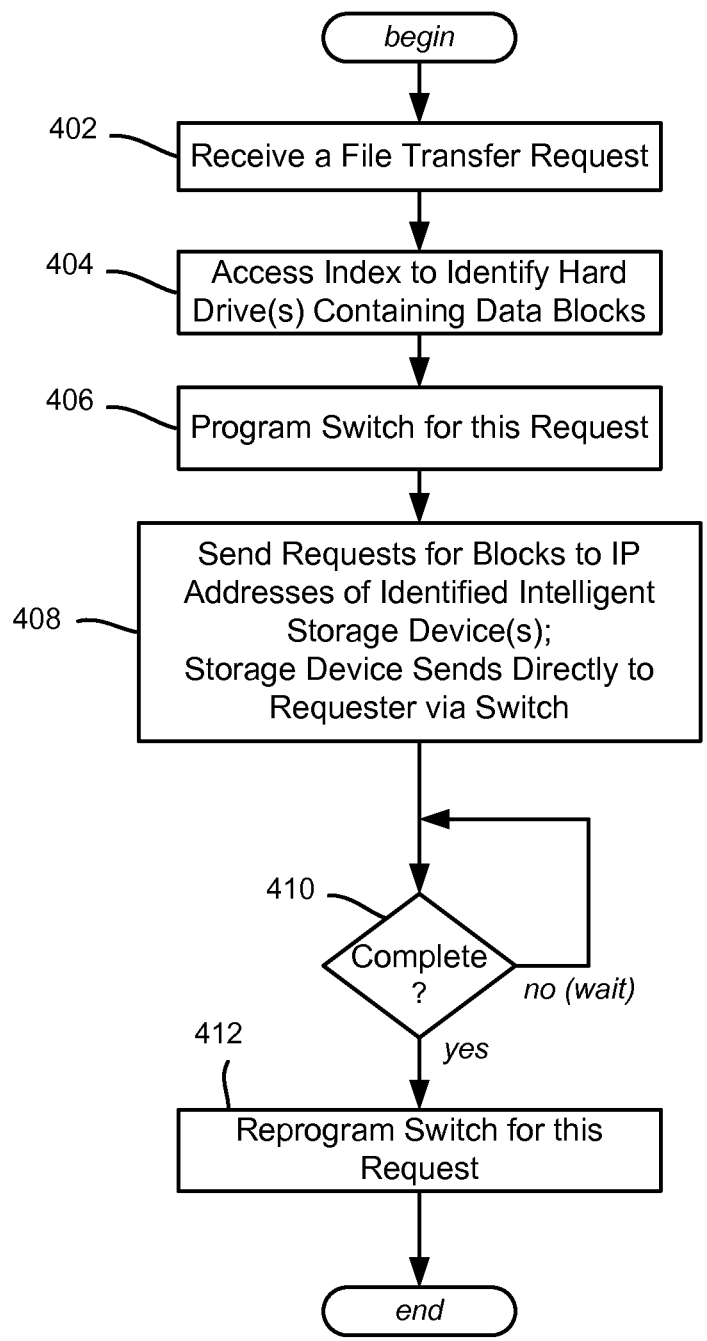
FIG. 4 is a flow diagram representing example steps that may be taken to handle a request for data by using intelligent storage devices to directly return data to a requesting client.

FIG. 4 is an example flow diagram showing example steps directed to handling a file transfer request such that the main server operates to handle the initial portion of a file transfer request and then offloads the actual data transfer directly to the intelligent storage devices. The intelligent storage devices, upon receiving the request from the server, transfer the data directly to the switch for sending to the destination, bypassing the server.

Step 402 represents receiving the request at the server, which may do some initial processing of the request. For example, the server may determine whether the requester is allowed to access the file/apply security policies to the request.

At step 404, the server accesses the index to identify on which intelligent storage devices the data blocks needed to satisfy the request are resident. Note that multiple intelligent storage devices may have copies of some of the same data blocks in a replicated system, for example, and the server may select one to provide that subset of the data blocks needed for this request, such as using load balancing techniques.

Step 406 represents programming the switch as needed for this request. As described above, the amount of programming needed may vary depending on which alternative is used. For example, the server may program the switch to expect these packets from identified intelligent storage devices and rewrite any headers as necessary. It is also feasible for a switch to combine responses corresponding to the same request into a lesser number of responses.

Step 408 represents sending the requests to the intelligent storage devices. Depending on how long it takes to program the switch, some delay time may be added so that the intelligent storage devices do not provide responses before the switch is ready to process the responses. As described above, via one of the transport mechanisms described herein, the switch directly sends the responses to the requester, without the server being needed to reassemble the blocks.

It should be noted that a different communications channel may be used for the server to communicate with the intelligent storage devices. However, because the intelligent storage devices are already configured to receive and send IP messages from and to the switch, it is convenient and efficient for the intelligent storage devices to each have an IP address, with communication with the server occurring via messages sent through the switch via that IP address.

Step 410 represents waiting for the request to be completed as generally described above. For example, the server (or possibly the switch logic) may collect acknowledgements from the recipient requestor and use them to determine when the request is fully satisfied.

As can be seen, with the technology described herein, a single server can be used to host a relatively large amount of storage. The size is limited only by the file system and the data structure used to index the files. Storage space can be provisioned incrementally by plugging in additional intelligent storage devices into the network.

Further, the server's CPU time is used efficiently because the server's responsibilities are only to implement security policy and locate the blocks on the intelligent storage devices rather than managing the data transfer. If the files and blocks are distributed relatively uniformly across the available intelligent storage devices, storage and bandwidth are also used efficiently. Because hard drives and associated logic may be provisioned instead of provisioning entire machines, there is also savings in power and cooling costs.

Example Operating Environment

Figure 5:
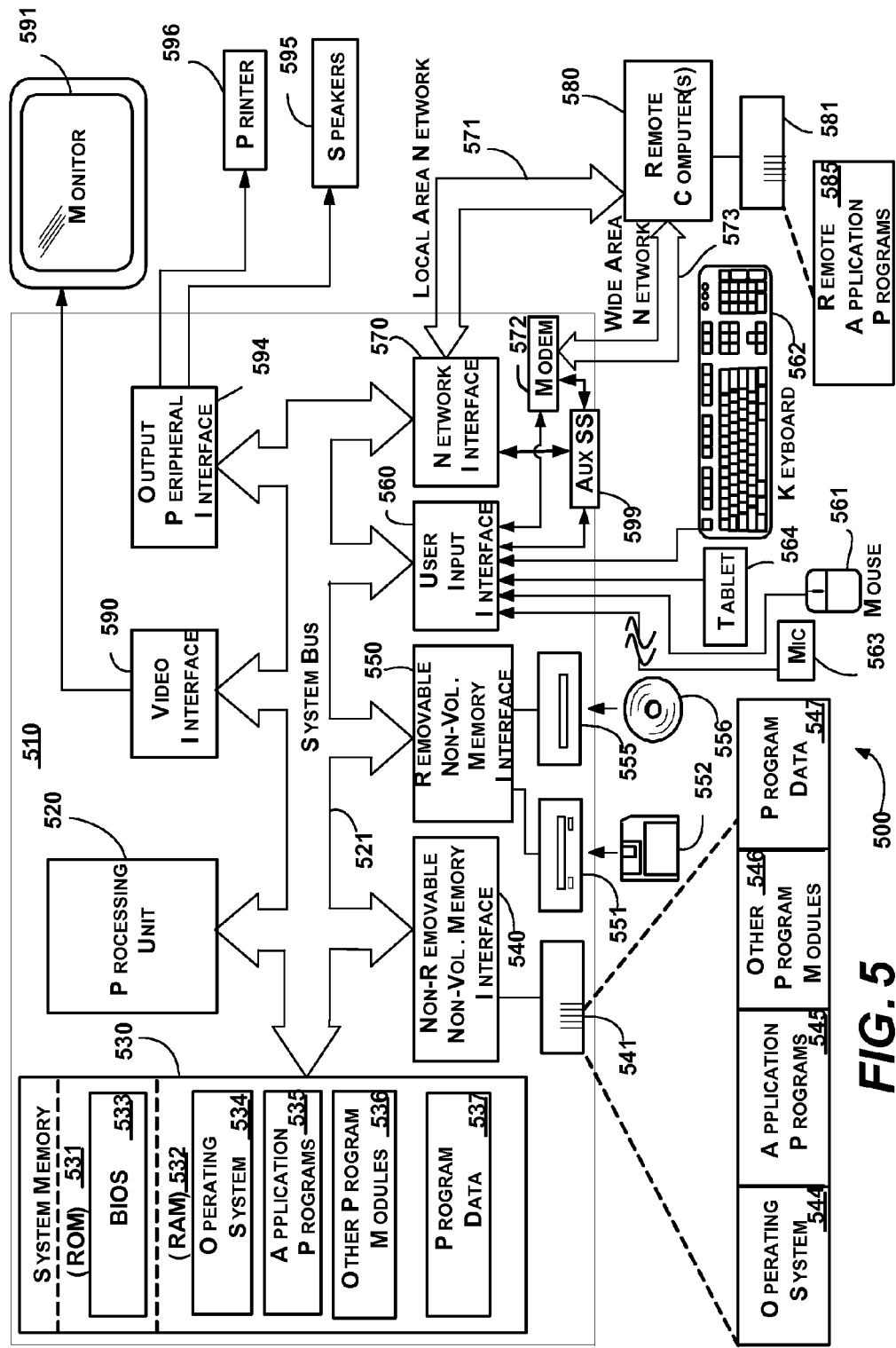
FIG. 5 is a block diagram representing an example computing environment into which aspects of the subject matter described herein may be incorporated.

FIG. 5 illustrates an example of a suitable computing and networking environment 500 into which the examples and implementations of any of FIGS. 1-4 may be implemented, for example. The computing system environment 500 is only one example of a suitable computing environment and is not intended to suggest any limitation as to the scope of use or functionality of the invention. Neither should the computing environment 500 be interpreted as having any dependency or requirement relating to any one or combination of components illustrated in the example operating environment 500.

The invention is operational with numerous other general purpose or special purpose computing system environments or configurations. Examples of well-known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 5, an example system for implementing various aspects of the invention may include a general purpose computing device in the form of a computer 510. Components of the computer 510 may include, but are not limited to, a processing unit 520, a system memory 530, and a system bus 521 that couples various system components including the system memory to the processing unit 520. The system bus 521 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 510 typically includes a variety of computer-readable media. Computer-readable media can be any available media that can be accessed by the computer 510 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 510. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above may also be included within the scope of computer-readable media.

The system memory 530 includes computer storage media in the form of volatile and/or nonvolatile memory such as read only memory (ROM) 531 and random access memory (RAM) 532. A basic input/output system 533 (BIOS), containing the basic routines that help to transfer information between elements within computer 510, such as during start-up, is typically stored in ROM 531. RAM 532 typically contains data and/or program modules that are immediately accessible to and/or presently being operated on by processing unit 520. By way of example, and not limitation, FIG. 5 illustrates operating system 534, application programs 535, other program modules 536 and program data 537.

The computer 510 may also include other removable/non-removable, volatile/nonvolatile computer storage media. By way of example only, FIG. 5 illustrates a hard disk drive 541 that reads from or writes to non-removable, nonvolatile magnetic media, a magnetic disk drive 551 that reads from or writes to a removable, nonvolatile magnetic disk 552, and an optical disk drive 555 that reads from or writes to a removable, nonvolatile optical disk 556 such as a CD ROM or other optical media. Other removable/non-removable, volatile/nonvolatile computer storage media that can be used in the example operating environment include, but are not limited to, magnetic tape cassettes, flash memory cards, digital versatile disks, digital video tape, solid state RAM, solid state ROM, and the like. The hard disk drive 541 is typically connected to the system bus 521 through a non-removable memory interface such as interface 540, and magnetic disk drive 551 and optical disk drive 555 are typically connected to the system bus 521 by a removable memory interface, such as interface 550.

The drives and their associated computer storage media, described above and illustrated in FIG. 5, provide storage of computer-readable instructions, data structures, program modules and other data for the computer 510. In FIG. 5, for example, hard disk drive 541 is illustrated as storing operating system 544, application programs 545, other program modules 546 and program data 547. Note that these components can either be the same as or different from operating system 534, application programs 535, other program modules 536, and program data 537. Operating system 544, application programs 545, other program modules 546, and program data 547 are given different numbers herein to illustrate that, at a minimum, they are different copies. A user may enter commands and information into the computer 510 through input devices such as a tablet, or electronic digitizer, 564, a microphone 563, a keyboard 562 and pointing device 561, commonly referred to as mouse, trackball or touch pad. Other input devices not shown in FIG. 5 may include a joystick, game pad, satellite dish, scanner, or the like. These and other input devices are often connected to the processing unit 520 through a user input interface 560 that is coupled to the system bus, but may be connected by other interface and bus structures, such as a parallel port, game port or a universal serial bus (USB). A monitor 591 or other type of display device is also connected to the system bus 521 via an interface, such as a video interface 590. The monitor 591 may also be integrated with a touch-screen panel or the like. Note that the monitor and/or touch screen panel can be physically coupled to a housing in which the computing device 510 is incorporated, such as in a tablet-type personal computer. In addition, computers such as the computing device 510 may also include other peripheral output devices such as speakers 595 and printer 596, which may be connected through an output peripheral interface 594 or the like.

The computer 510 may operate in a networked environment using logical connections to one or more remote computers, such as a remote computer 580. The remote computer 580 may be a personal computer, a server, a router, a network PC, a peer device or other common network node, and typically includes many or all of the elements described above relative to the computer 510, although only a memory storage device 581 has been illustrated in FIG. 5. The logical connections depicted in FIG. 5 include one or more local area networks (LAN) 571 and one or more wide area networks (WAN) 573, but may also include other networks. Such networking environments are commonplace in offices, enterprise-wide computer networks, intranets and the Internet.

When used in a LAN networking environment, the computer 510 is connected to the LAN 571 through a network interface or adapter 570. When used in a WAN networking environment, the computer 510 typically includes a modem 572 or other means for establishing communications over the WAN 573, such as the Internet. The modem 572, which may be internal or external, may be connected to the system bus 521 via the user input interface 560 or other appropriate mechanism. A wireless networking component 574 such as comprising an interface and antenna may be coupled through a suitable device such as an access point or peer computer to a WAN or LAN. In a networked environment, program modules depicted relative to the computer 510, or portions thereof, may be stored in the remote memory storage device. By way of example, and not limitation, FIG. 5 illustrates remote application programs 585 as residing on memory device 581. It may be appreciated that the network connections shown are examples and other means of establishing a communications link between the computers may be used.

An auxiliary subsystem 599 (e.g., for auxiliary display of content) may be connected via the user interface 560 to allow data such as program content, system status and event notifications to be provided to the user, even if the main portions of the computer system are in a low power state. The auxiliary subsystem 599 may be connected to the modem 572 and/or network interface 570 to allow communication between these systems while the main processing unit 520 is in a low power state.

Alternatively, or in addition, the functionally described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

CONCLUSION

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. In a computing environment, a method performed at least in part on at least one processor comprising:
receiving, at a server, a request for data access from a requester;
identifying one or more intelligent storage devices that contain data blocks corresponding to the request;
sending a communication from the server to the identified one or more intelligent storage devices to access the data blocks and return the data blocks in response to the communication to a network switch; and
taking action to have at least some of the data blocks sent in a response or set of responses to the requester, in which the response or the set of responses identifies the server as a sender without the data blocks being sent by the server, and in which the response or the set of responses includes a plurality of packets, a first packet of the plurality of packets having a flag that indicates a beginning of the response or the set of responses and a last packet of the plurality of packets having another flag that indicates an end of the response or the set of responses, wherein taking the action further comprises extending a transmission control protocol (TCP) request with extended data to include Internet Protocol (IP) addresses of the identified one or more intelligent storage devices, and programming the network switch to use the extended data to send the TCP request to the identified one or more intelligent storage devices and to remove any extended data upon sending a corresponding response from the identified one or more intelligent storage devices to the requester and further programming the identified one or more intelligent storage devices to write an IP address of the server into a TCP header of the corresponding response as an IP address of the sender, and to program the network switch to ignore an IP address of an actual sender.

2. The method of claim 1 wherein identifying the one or more intelligent storage devices comprises accessing an index maintained by the server.

3. The method of claim 1 wherein receiving the request for data access comprises receiving, based upon the address of the server, a file transfer request that includes a TCP header.

4. The method of claim 1 wherein sending the communication comprises sending a message to the IP addresses associated with the one or more intelligent storage devices.

5. The method of claim 1 wherein taking the action comprises programming the network switch to modify information in the response or the set of responses to identify the server as the sender.

6. The method of claim 5 further comprising, reprogramming the switch upon the response or the set of responses completing the request.

7. The method of claim 1 wherein taking the action comprises programming the network switch to modify information in the response or the set of responses to set the requester address as the destination of the response or destination of the set of responses.

8. The method of claim 1, wherein the one or more intelligent storage devices have network addresses, and wherein the server is configured to communicate with the identified one or more intelligent storage devices via the network addresses of concerned intelligent storage devices.

9. The method of claim 1, wherein the identified one or more intelligent storage devices are configured to provide a response to the server that includes requested data stored on the identified one or more intelligent storage devices, the identified one or more intelligent storage devices further configured to replace the server as a destination for the response with the destination identified in the request.

10. A system comprising, a server, an index coupled to the server, a network switch coupled to the server, and a plurality of intelligent storage devices coupled to the server, the server configured to respond to a request for stored data by accessing the index to identify which intelligent storage device or devices contain the data, the server further configured to communicate with the identified intelligent storage device or devices to have the identified intelligent storage device or devices retrieve the stored data and send the stored data via the network switch to a destination identified in the request in which the network switch is configured to include a plurality of packets in a response that includes the sent stored data, a first packet of the plurality of packets having a flag that indicates a beginning of the response and a last packet having another flag that indicates an end of the response, and in which the server is further configured to send the first packet and the last packet, wherein communicating with the identified intelligent storage device or devices further comprises extending a transmission control protocol (TCP) request with extended data to include Internet Protocol (IP) addresses of the identified intelligent storage device or devices, and programming the network switch to use the extended data to send the TCP request to the identified intelligent storage device or devices and to remove any extended data upon sending a corresponding response from the identified intelligent storage device or devices in response to the request and further programming the identified intelligent storage device or devices to write an IP address of the server into a TCP header of the corresponding response as an IP address of a sender, and to program the network switch to ignore an IP address of an actual sender.

11. The system of claim 10 wherein the server is configured to program the network switch to send the stored data that is retrieved to the destination instead of to the server.

12. The system of claim 10 wherein the storage device or devices have network addresses, and wherein the server is configured to communicate with the intelligent storage device or devices via the network address of concerned intelligent storage device.

13. The system of claim 12 wherein the server is configured to extend a TCP message containing a TCP header with an extension comprising a network address of an identified intelligent storage device, and wherein the network switch is configured to recognize the network address of the identified intelligent storage device and send the TCP message to the intelligent storage device instead of to an address in the TCP header.

14. The system of claim 13 wherein the network switch is further configured to receive a response message from the intelligent storage device, to remove any extension in the response message, and to send the TCP message, modified with data provided by the intelligent storage device, to a destination address identified in the TCP header.

15. The system of claim 10 wherein an identified intelligent storage device is configured to provide a response to the server communication that includes requested data stored on the identified intelligent storage device, the identified intelligent storage device further configured to replace the server as a destination for the response with the destination identified in the request.

16. The system of claim 15 wherein the network switch is configured to receive the response from the intelligent storage device and to send the response to the destination identified in the request.

17. The system of claim 10 wherein at least one intelligent storage device comprises an integrated circuit coupled to a hard drive.

18. One or more computer-readable memories having computer-executable instructions, which upon execution perform operations, comprising:
programming logic associated with a hard drive, the logic programmed to receive messages via an Internet Protocol (IP) address associated with the hard drive and to return corresponding response messages;
receiving, at the logic, a transmission control protocol (TCP)-based request message from a server for one or more data blocks maintained on the hard drive, and returning a TCP response message that includes the data in the one or more data blocks; and
sending the response message to a destination IP address that is not the server IP address, in which sending the response message to the destination IP address that is not the server IP address includes sending a plurality of packets, a first packet of the plurality of packets having a flag that indicates a beginning of the response message and a last packet having another flag that indicates an end of the response message, and in which the first packet and the last packet are sent by the server, wherein sending the response message to a destination IP address that is not the server IP address further comprises extending the TCP-based request message with extended data to include the IP address of the hard drive, and programming a network switch to use the extended data to send the TCP-based request message to the hard drive and to remove any extended data upon sending a corresponding response from the hard drive in response to the TCP-based request message and further programming the logic associated with the hard drive to write an IP address of the server into a TCP header of the corresponding response as an IP address of a sender, and to program the network switch to ignore an IP address of an actual sender.

19. The one or more computer-readable memories of claim 18 wherein sending the response to a destination IP address that is not the server IP address comprises programming the network switch that adds the flag that indicates the beginning of the response message and adds the other flag that indicates the end of the response message.

20. The one or more computer-readable memories of claim 18 wherein sending the response to a destination IP address that is not the server IP address comprises providing a TCP header that includes the destination IP address, extending the message with information that includes the IP address associated with the hard drive, using the IP address associated with the hard drive to send the request message, and using the destination IP address to send the response message.

* * * * *